W. RIETZ.
PIN BEARING.
APPLICATION FILED OCT. 30, 1915.

1,300,485.

Patented Apr. 15, 1919.

INVENTOR
William Rietz.
By Morsell, Keeney & French,
ATTORNEYS

UNITED STATES PATENT OFFICE.

WILLIAM RIETZ, OF SHEBOYGAN FALLS, WISCONSIN, ASSIGNOR TO WHITE WAGON WORKS, OF SHEBOYGAN FALLS, WISCONSIN, A CORPORATION OF WISCONSIN.

PIN-BEARING.

1,300,485.  Specification of Letters Patent.  Patented Apr. 15, 1919.

Application filed October 30, 1915. Serial No. 58,742.

*To all whom it may concern:*

Be it known that I, WILLIAM RIETZ, a citizen of the United States, and resident of Sheboygan Falls, in the county of Sheboygan and State of Wisconsin, have invented new and useful Improvements in Pin-Bearings, of which the following is a description, reference being had to the accompanying drawings, which are a part of this specification.

This invention relates to improvements in pin bearings.

It is one of the objects of the present invention to provide a pin bearing more particularly, but not solely, adapted for use with vehicle wheels to lessen friction and to exclude dust from the bearing.

A further object of the invention is to provide a pin bearing in which the bearing pins or rollers will be retained in position within the hub against accidental displacement when the axle or shaft upon which the wheel is journaled has been withdrawn from the hub.

A further object of the invention is to provide a pin bearing in which the means for holding the dust cap in position also serves to maintain the hub upon the axle in a very simple manner.

A further object of the invention is to provide a pin bearing adapted for use in connection with children's wagons.

A further object of the invention is to provide a pin bearing which is of simple construction, is strong and durable and is well adapted for the purpose described.

With the above and other objects in view the invention consists of the improved pin bearing and its parts and combinations as set forth in the claim, and all equivalents thereof.

In the accompanying drawing in which the same reference characters indicate the same parts in all of the views.

Figure 1:
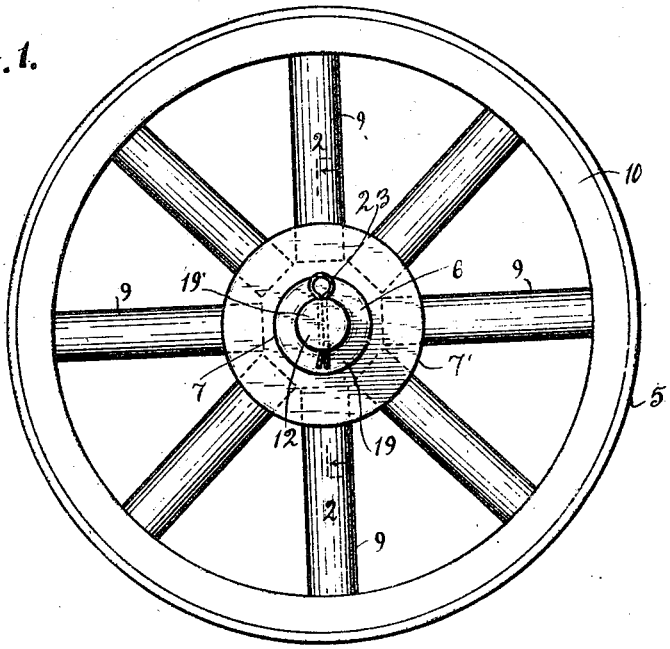
Figure 1 is a side view of a wheel provided with the improved construction.
Figure 2:
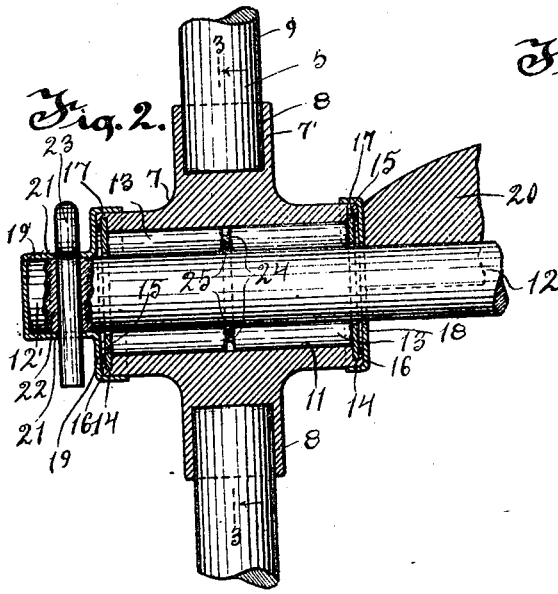
Fig. 2 is a vertical sectional view thereof taken on line 2—2 of Fig. 1.
Figure 3:
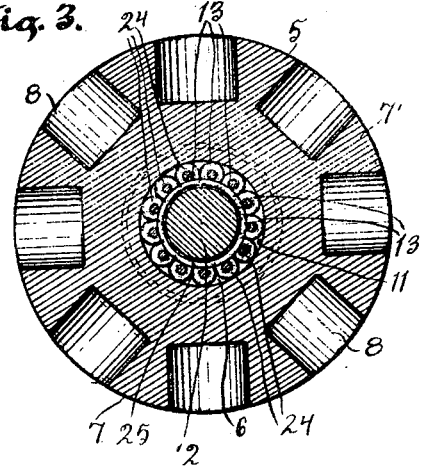
Fig. 3 is a sectional view thereof taken on line 3—3 of Fig. 2.

Referring to the drawing the numeral 5 indicates a children's wagon wheel provided with the improved pin bearing 6. The wheel is formed with a metal hub 7 having a medial annular flange 7' provided with radially extending sockets 8 into which the inner ends of the spokes 9 extend. The outer ends of the spokes are connected to the felly 10 of the wheel in the usual manner. The hub 7 of the wheel is provided with a bore 11 of larger diameter than the axle 12 to accommodate bearing pins or rollers 13 interposed between the axle and hub. The outer ends of the hub are formed with recessed portions 14 of larger diameter than the bore 11 to receive washers 15. These washers hold the bearing pins against endwise movement and are held in position by slightly riveting over the peripheral edge portions 16 of the annular hub shoulders 17 formed by the recessed portions 14.

Hub dust caps 18 and 19 extend over the opposite ends of the hub to prevent dust entering the bore of said hub. The hub cap 18 is held in position by engagement with the end portion of the gear 20 while the hub cap 19 has a closed end extension 19' which covers over the projecting end portion 12' of the shaft 12. The cap extension 19' has an opening 21 extending transversely therethrough which is in register with a similar opening 22 formed in the projecting portion of the axle and through the openings a cotter pin 23 is inserted to retain the wheel and the hub cap in position.

Portions of the bearing pins medially of their length are reduced in diameter to form registering annular grooves or recesses 24 to receive the retaining ring 25 therein. The bearing pins are positioned around the ring before being inserted endwise into the bore of the hub and when inserted the ring will hold the bearing pins in position without the possibility of being accidentally displaced. The annular grooves or recesses of the pins are of sufficient size to form a loose fit for the ring and the ring is of slightly larger diameter than the axle or shaft in order to eliminate friction as much as possible.

While the invention has been exemplified in connection with a child's vehicle wheel it is to be understood that it may also be used with equal advantage for bearings of various kinds.

From the foregoing description it will be seen that the invention is of very simple construction and is well adapted for the purpose described.

What I claim as my invention is:

A pin bearing, comprising a hub member provided with a bore and having annular end recesses and radially extending spoke recesses, an axle extending through the bore and having a transverse opening at its outer end, a plurality of bearing pins positioned within the bore between the axle and the hub member and having annular grooves medially of their length, an annular member surrounding the axle and entering the annular grooves of the bearing pins, washers surrounding the axle and entering the annular end recesses, said washers being of less thickness than the depth of the washers and the projecting end portions of the hub forming the recesses being bent over the washers to maintain them in position, cap members surrounding the axle and bearing against the opposite end portions of the hub member, said cap members having annular flanges which extend over and tightly engage the ends of the hub member, and a pin extending through the axle for holding the hub on the axle.

In testimony whereof, I affix my signature.

WILLIAM RIETZ.